United States Patent
Zheludev et al.

(10) Patent No.: US 9,594,262 B2
(45) Date of Patent: Mar. 14, 2017

(54) OPTICAL DEVICES, SYSTEMS AND METHODS

(71) Applicant: University of Southampton, Southampton (GB)

(72) Inventors: Nikolay Ivanovich Zheludev, Southampton (GB); Kevin Francis MacDonald, Southampton (GB); Jianfa Zhang, Changsha (CN); David John Richardson, Southampton (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 14/388,261

(22) PCT Filed: Mar. 12, 2013

(86) PCT No.: PCT/GB2013/050603
§ 371 (c)(1),
(2) Date: Sep. 26, 2014

(87) PCT Pub. No.: WO2013/144559
PCT Pub. Date: Oct. 3, 2013

(65) Prior Publication Data
US 2015/0049377 A1 Feb. 19, 2015

(30) Foreign Application Priority Data
Mar. 26, 2012 (GB) .................................. 1205293.2

(51) Int. Cl.
*G02B 26/00* (2006.01)
*G02F 1/00* (2006.01)
(Continued)

(52) U.S. Cl.
CPC ........... *G02F 1/0126* (2013.01); *G02B 1/002* (2013.01); *G02B 5/008* (2013.01); *G02F 3/00* (2013.01);
(Continued)

(58) Field of Classification Search
USPC ................................ 359/237–324, 227, 230
See application file for complete search history.

(56) References Cited

U.S. PATENT DOCUMENTS

| 8,988,759 B2 * | 3/2015 | Bowers | G02B 1/005 343/909 |
| 9,099,786 B2 * | 8/2015 | Bowers | G02B 1/005 |

(Continued)

FOREIGN PATENT DOCUMENTS

WO   2011/001253 A1   1/2011

OTHER PUBLICATIONS

International Search Report and Written Opinion for corresponding patent application No. PCT/GB2013/050603 dated Jun. 19, 2013.
(Continued)

*Primary Examiner* — Mohammed Hasan
(74) *Attorney, Agent, or Firm* — Renner, Otto, Boisselle & Sklar, LLP

(57) ABSTRACT

First and second coherent light beams of the same wavelength are propagated in opposite directions to interact on a sub-wavelength thickness metallic metamaterial layer which is structured with a periodicity such that there is a resonance matched to the wavelength of the coherent beams. The first beam is then able to modulate the intensity of the second beam by modulating the phase and/or intensity of the first beam. The interference of the counter- propagating beams can eliminate or substantially reduce Joule loss of light energy in the metamaterial layer or, on the contrary, can lead to a near total absorption of light, depending on the mutual
(Continued)

phase and/or intensity of the interacting beams. A modulation is thus provided without using a non-linear effect.

25 Claims, 12 Drawing Sheets

(51) Int. Cl.
  *G02F 1/01*   (2006.01)
  *G02B 1/00*   (2006.01)
  *G02F 3/00*   (2006.01)
  *G02B 5/00*   (2006.01)

(52) U.S. Cl.
  CPC ...... *G02F 2202/30* (2013.01); *G02F 2202/36* (2013.01); *G02F 2203/10* (2013.01); *G02F 2203/15* (2013.01)

(56) References Cited

U.S. PATENT DOCUMENTS

| 9,274,352 B2* | 3/2016 | Long | G02F 1/0126 |
| 2006/0109540 A1* | 5/2006 | Kueks | G02F 1/0126 359/321 |
| 2008/0192331 A1* | 8/2008 | Wang | B82Y 20/00 359/315 |

OTHER PUBLICATIONS

Chong et al.; "Coherent Perfect Absorbers: Time-reversed Lasers", Department of Applied Physics, Yale University, IEEE 2010, June.

Dutta-Gupta et al.; "Controllable coherent perfect absorption in a composite film", Nanophotonics and Metrology Laboratory, Swiss Federal Institute of Technology, Switzerland, Optics Express, vol. 20, No. 2, Jan. 16, 2012.

Claire F. Gmachl, "Suckers for light", University of Toronto, Canada, Nature, vol. 467, Sep. 2, 2010.

Combined Search and Examination Report for corresponding Application No. GB1205293.2 dated Jul. 20, 2012.

Pu et al.; "Ultrathin broadband nearly perfect absorber with symmetrical coherent illumination", Institute of Optics and Electronics, China, Optics Express, vol. 20, No. 3, Jan. 30, 2012.

Wan et al.; "Time-reversed Lasing and Control of Absorption in a Two-channel Coherent Perfect Absorber", Department of Applied Physics, Yale University, Optical Society of America, 2010.

Wan et al.; "Time-Reversed Lasing and Interferometric Control of Absorption", Department of Applied Physics, Yale University, Science, vol. 331, Feb. 18, 2011.

\* cited by examiner

1)

2)

3)

4)

5)

6)

7)

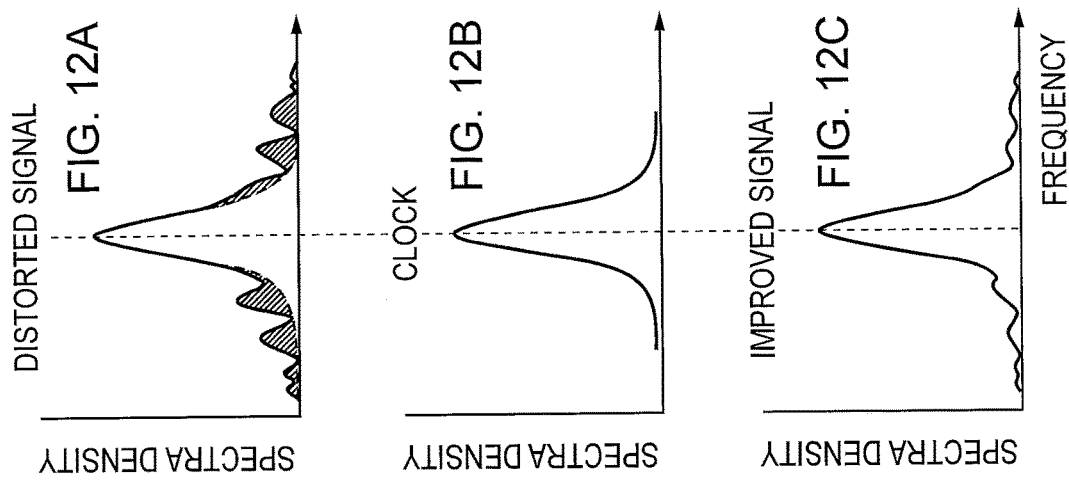
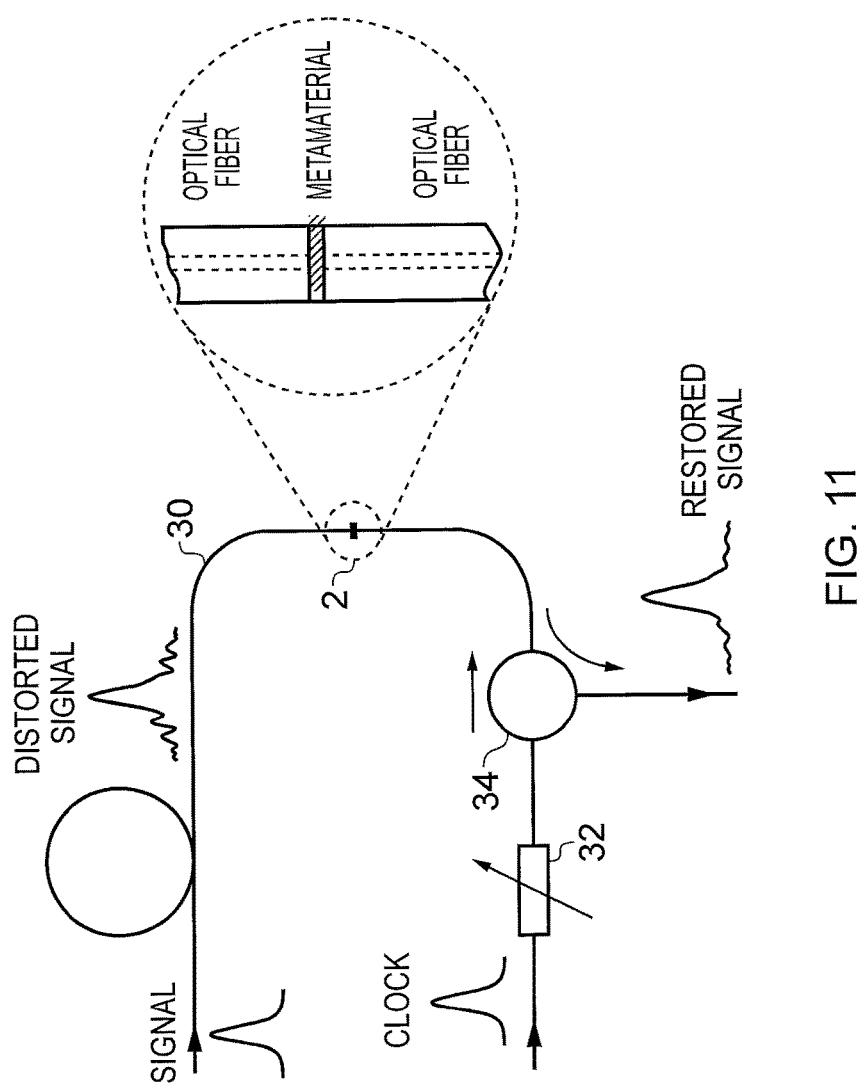

OPTICAL DEVICES, SYSTEMS AND METHODS

This application is a national phase of International Application No. PCT/GB2013/050603 filed Mar. 12, 2013 and published in the English language.

BACKGROUND OF THE INVENTION

The invention relates to devices and related systems and methods for affecting transmission of a first light beam passing through a layer from one side through use of a second light beam incident on the layer from the other side. The invention finds application in fields such as optical signal processing, optical computing, optical sensing and optical spectroscopy.

The common wisdom in optics is that light beams travelling in different and even opposite directions pass though one another without mutual disturbance. This is known as the superposition principle of linear optics.

In order to allow light signals to interact in such a way that one light signal can modulate or control another light signal, a non-linear medium is used in which intense optical fields provided by lasers interact. Such arrangements allow the superposition principle to be broken in nonlinear optics.

However, using non-linear effects in a non-linear medium for beam interaction typically requires intense laser fields thereby necessitating high power consumption and significant costs. These features of non-linear interactions make light-by-light modulation either unavailable or unsuitable for many applications, such as data processing, where it could otherwise be very useful.

Composite and layered structures have attracted recent interest to provide so-called coherent perfect absorption (CPA), i.e. to absorb the entirety of an incident laser beam.

Dutta-Gupta et al, "Controllable coherent perfect absorption in a composite film" Optics Express, vol. 20 p. 1330-1336 (2012) describe how a metal/dielectric composite might be used to achieve coherent perfect absorption (CPA) in a plasmonic metal/dielectric composite slab of thickness d=5 µm which is illuminated by coherent light from both sides of wavelength $\lambda$=562 nm. The light wavelength is matched to the plasmon resonance of the slab which is at around $\lambda$=540 nm. The paper suggests tuning the plasmon resonance of the composite by varying the volume fraction of the metal.

Pu et al, "Ultrathin broadband nearly perfect absorber with symmetrical coherent illumination" Optics Express, vol. 20 p. 2246-2254 (2012) describe how a thin layer of tungsten of thickness 17 nm can be used as a CPA device. A tungsten CPA is expected on the basis of the metal's bulk dielectric permittivity to have an operational wavelength range of 800 nm-1500 nm and also have absorption over a very broad wavelength range, so it is suggested for use in a solar cell for absorbing sunlight.

SUMMARY OF THE INVENTION

According to one aspect of the invention, there is provided a device for processing light with light, comprising: a first input for receiving a signal beam of coherent light at a wavelength; a second input for receiving a control beam of coherent light having the same wavelength; a metamaterial element having a thickness and lateral structure having a size scale substantially smaller than the wavelength of the beams and arranged to receive the control beam and the signal beam on opposite sides thereof; a phase and intensity adjuster operable to set the mutual phase of the signal and control beams such that a standing wave is formed having a node or an antinode coinciding with the metamaterial element; and an output for transmitting a component of the signal beam after transmission through the metamaterial element.

The metamaterial element could be a film or layer structured on the sub-wavelength scale in a periodic fashion. This may be a film of metal, metal alloy, conductive oxide, graphene, carbon nanotubes, fullerenes or semiconductor. The film or layer is structured in a way to provide enhanced optical absorption on the said wavelength so for optimal operation the absorption of the film in one direction is 50 percent, i.e. in practice close to 50 percent, such as to within 50±10%, 50±5%, 50±4%, 50±3%, 50±2% or 50±1%.

The sub-wavelength thickness of the metamaterial sheet enables it to become a 'perfect' transmitter when the mutual phase of the signal and control beams has a node in the plane of the sheet. Without satisfying that requirement, i.e. with a 'thick' film having a thickness of around half a wavelength or more, full or near-full transmission cannot be achieved and the modulation capability of the metamaterial layer will be limited. Moreover, the lateral structure in the plane of the metamaterial sheet allows a sufficiently strong resonant absorption to be provided at the design wavelength by providing a periodic metastructure matched to the design wavelength.

The device may further comprise a control laser source for providing the control beam to the first input and/or a signal laser source, coherent with the first laser source for providing the signal beam to the second input. Alternatively, a single laser source can provide both the control beam and the signal beam to the first and second inputs respectively. A sensor can be incorporated as part of the device for detecting intensity of the component of the signal beam transmitted through the output. The sensor can be connected to the intensity and phase adjuster, e.g. by an electrical control line, to set the mutual phase and intensity responsive to detected intensity.

The adjuster can include a phase modulator. The phase modulator is operable to vary the phase of the control beam incident on the metamaterial element, so as to switch between a node and an antinode of the standing wave, i.e. interference pattern, coinciding with the metamaterial element, thereby to effect a modulation of the signal beam's transmission through the metamaterial element. When a phase modulator is provided, it can be operated to vary the phase of the control beam incident on the metamaterial element in amounts of $n\lambda/2$, where n=1, 3, 5 etc., so as to switch between a node and an antinode being coincident with the metamaterial element.

An intensity modulator can be provided to vary the intensity of the control beam incident on the metamaterial element between first and second intensities to effect a modulation of the signal beam's transmission through the metamaterial element. For example, if the phase adjuster maintains the mutual phase of the signal and control beams such that their interference pattern has a node at the metamaterial element, then intensity modulation of the control beam, e.g. to selectively switch off the control beam, will serve to intensity modulate the transmitted signal beam between perfect transmission (with the control beam) and partial transmission (without the control beam). When an intensity modulator is provided, it is preferably operable to vary the intensity of the control beam incident on the metamaterial element between first and second intensities, wherein the first intensity is at least 10 times smaller than the second intensity, and further preferably substantially zero.

The metamaterial element can have metastructure of a suitable periodicity to provide a resonance that has at least a substantial component at the wavelength of the control and signal beams, i.e. the resonance is matched to the operating wavelength of the device. This resonance may have plasmonic nature or could be related to other resonance excitations of the metamaterial structure.

Examples of materials that could provide a suitable layer for supporting plasmons are: gold, silver, aluminium, copper, alkali metals, intermetallics (silicides, germanides, borides, nitrides, oxides, and metallic alloys including titanium nitride, tungsten/tantalum silicide or germanide, vanadium/titanium/aluminium oxides), transparent conductive oxides (e.g. indium tin oxide, aluminium/gallium-doped zinc oxide, silicon carbide, gallium arsenide), graphene, and semiconductors.

In some embodiments, the output is also arranged to transmit a component of the control beam after transmission through the metamaterial element. For example the transmitted components of the signal and control beams can be combined and output together.

The thickness and lateral structure of the metamaterial element can be dimensioned such that the transmitted component of the signal beam in the presence of said control beam when a node of the interference pattern is coincident with the metannaterial element has an intensity greater than in the absence of said control beam.

The thickness and lateral structure of the metamaterial element can be dimensioned such that the transmitted component of the signal beam in the presence of said control beam when a node of the interference pattern is coincident with the metamaterial element has at least 70, 80, 90, 95 or 98% of the intensity of the signal beam incident on the metamaterial element.

The metamaterial element can be embedded in, or on the end face of, a waveguide transverse to the waveguide channel. The waveguide can be an optical fibre. In a conventional fibre, the channel will be the single core of the optical fibre. However, the channel may be the cladding of a cladding pumped fibre or multiple cores of a multicore fibre. The waveguide may also be a planar waveguide, e.g. semiconductor or lithium niobate or related material.

The metamaterial element can be a free-standing element or can be attached to a substrate. The substrate in most embodiments will be transparent, but in some embodiments could be partially absorbing film to increase overall absorption.

According to another aspect of the invention, there is provided a method of processing light with light comprising: providing a signal beam of coherent light at a wavelength; providing a control beam of coherent light having the wavelength; providing a metamaterial element having a thickness substantially smaller than the wavelength of the beams and structured laterally on a size scale substantially smaller than the wavelength of the beams; directing the control beam and the signal beam to be incident on the metamaterial element in opposite directions; and setting the mutual phase of the signal and control beams such that a standing wave is formed having a node or an antinode coinciding with the metamaterial element, thereby to control transmission of the signal beam through the metamaterial element.

The method may further comprise: measuring the intensity of the signal beam after its transmission through the metamaterial element.

The metamaterial element can be made from a structured metal layer supported by a substrate. The substrate will typically be made of a material that is substantially transparent in the operating wavelength range of the metamaterial material. In other cases, the periodically structured layer is self supporting, i.e. there is no substrate, at least not over the active area exposed to the control and signal beams. The lateral metastructuring is preferably periodic in two-dimensions (2D). Three-dimensional (3D) or one-dimensional (1D) periodicity could also be used. In the case of 2D or 3D structuring, the period in each of the two- or three-dimensions is preferably equal. The layer can be fabricated as a metamaterial having in-plane structure of a dimension less than half the operating wavelength, or less than half of the minimum operating wavelength in the case the device has a range of operating wavelengths. The metamaterial layer may also have out-of-plane sub-wavelength structure that satisfies the same dimensional criteria as the in-plane structure. The in-plane and out-of-plane structure is preferably periodic. The in-plane structure may be periodic in one direction or in two non-parallel directions, for example two orthogonal directions.

The device based on a metamaterial film sheet can be made to operate at any desired wavelength across the visible (e.g. 400 nm-700 nm) to near-infrared wavelength (e.g. 700 nm to 2.5 micrometres) range by choosing the structuring of the metamaterial accordingly.

Applications of the present devices include ultrafast pulse-recovery devices, coherence filters and THz-bandwidth light-by-light modulators. Since the present devices do not require non-linear media or intense laser fields, they can operate at extremely low power levels.

The metamaterial element could be a film or layer structured on the sub-wavelength scale a periodic fashion. The film or layer may be made of metal, metal alloy, conductive oxide, graphene, carbon nanotubes, fullerenes or semiconductor. The film or layer can be structured in a way to provide enhanced optical absorption at the design wavelength, so for optimal operation the absorption of the film in one direction is 50 percent.

BRIEF DESCRIPTION OF THE DRAWINGS

The invention is now described by way of example only with reference to the following drawings.

FIG. 11 is a schematic system of an optical fibre transmission system incorporating the pulse recovery device of FIG. 9a.

FIGS. 12a, 12b and 12c are graphs showing the spectral density of the distorted signal, clock signal and improved signal respectively for the system of FIG. 11.

DETAILED DESCRIPTION

In the following, we describe how first and second coherent light beams of arbitrarily low intensity are propagated in opposite directions to interact on a sub-wavelength thickness plasmonic sheet or layer such that the first beam is able to modulate the intensity of the second beam by modulating the phase and/or intensity of the first beam. Moreover, we show experimentally and illustrate by computer modelling that interference of counter-propagating beams can eliminate or substantially reduce plasmonic Joule loss of light energy in the plasmonic layer or, on the contrary, can lead to a near total absorption of light, depending on the mutual phase and/or intensity of the interacting beams. The coherent light beams can be of arbitrarily low intensity, since the effect being exploited is not a non-linear one.

Figure 1B:
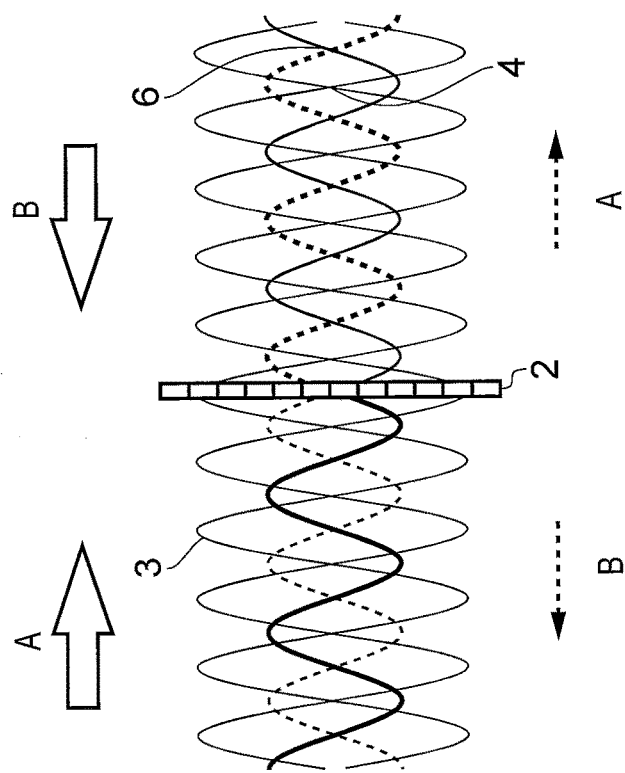
FIGS. 1a and 1b are schematic drawings illustrating the principle of light-by-light modulation devices embodying the invention.
Figure 1A:
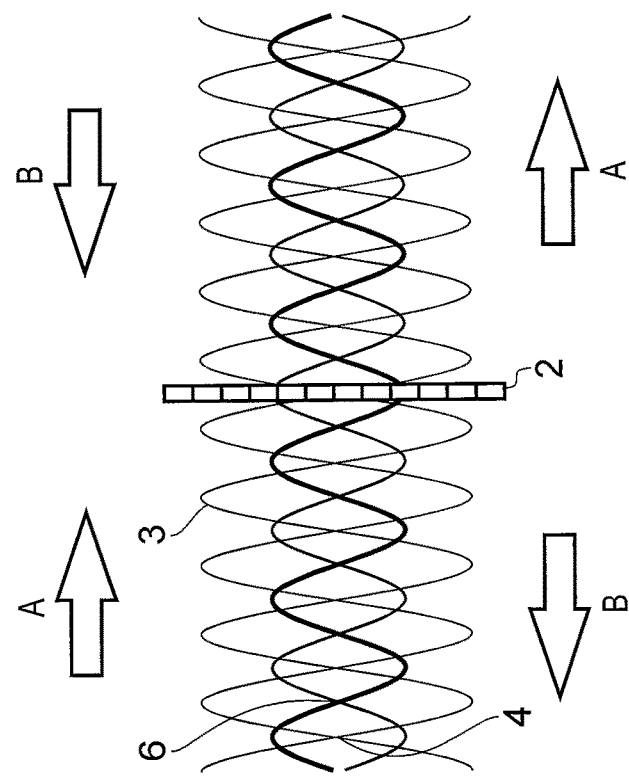

FIGS. 1a and 1b are schematic drawings illustrating the operating principles of a device example to provide light-by-light modulation. The device operates using first and second coherent light beams A and B of the same wavelength. A thin planar light-absorbing plasmonic metamaterial element 2 is arranged to receive the light beams A and B from either side. The metamaterial element 2 is ideally an infinitely thin sheet compared with the intended operating wavelength of the device. In practice, the thickness of the metamaterial element needs to be considerably less than the intended operating wavelength of the device, for example less than λ/5, λ/6, λ/7, λ/8, λ/9 or λ/10. In both FIGS. 1a and 1b, beam A is incident on the plasmonic metamaterial element 2 from left to right, and beam B is incident on the metamaterial element 2 from right to left. Beams A and B are thus incident on the metamaterial element 2 from opposite directions. FIGS. 1a and 1b show the two extreme cases of interference of the two light beams A and B at the metamaterial element 2.

In the first case, as shown by FIG. 1a, beams A and B interfere such that a standing wave pattern 3 is formed with a zero-field node 4 at the position of the metamaterial element 2. As the metamaterial element 2 is much thinner than the wavelength of the light, its interaction with the electromagnetic field at the field minimum is negligible. The metamaterial element will therefore act as if it were not present, i.e. as if it were transparent to each of the beams.

In the second case, as shown by FIG. 1b, the metamaterial element is at a standing wave field maximum of the superposed fields from A and B, i.e. at an antinode 6. The metamaterial element in this case strongly disturbs the wave. Absorption becomes very efficient and the metamaterial element 2 is opaque to both beams, completely blocking transmission of the light in both directions, at least in the ideal case. The broken lines and broken arrows in FIG. 1b represent absence of the light waves, i.e. the absence of beams A and B as a result of the beam having been absorbed by the metamaterial element 2.

Altering the phase or intensity of one of the beams will disturb the interference pattern and thus will change the absorption of the other beam. For instance, if the metamaterial element 2 is placed at a node 4 of the standing wave, blocking of beam B will lead to the immediate increase of loss and decrease of intensity of the transmitted beam A. In another example, if the metamaterial element is placed at an antinode 6 of the standing wave, blocking beam B will lead to the decrease of loss and increase of intensity of the transmitted beam A.

In one mode of operation, the device thus allows the intensity of beam A transmitted through the material element 2 to be changed by manipulating the intensity of beam B, e.g. by blocking beam B or switching off beam B. In another mode of operation, the device thus allows the intensity of beam A transmitted through the metamaterial element 2 to be changed by manipulating the phase position of the metamaterial element 2 in the beams A and B. e.g. by altering the phase of one or both of the beams A and B or by moving the metamaterial element 2 in the beam propagation direction.

To optimize the modulation efficiency, the metamaterial element 2 should ideally absorb half the energy of a single one of the beams A or B passing through it. In this case, 100% light-by-light modulation can be achieved when beam A is modulated by controlling the phase of beam B. Also, 50% modulation can be achieved when beam A is modulated by controlling the intensity of beam B, since if the intensity of beam B is reduced to zero, the metamaterial element is illuminated by the beam A and, as already stated, the metamaterial element is designed to absorb half the energy of a single beam passing through it. Moreover, when the intensity of both beams are equal and the metamaterial element is placed in an antinode 6, all light entering the metamaterial element will be absorbed, while if the metamaterial element is placed in a node 4, no Joule losses will take place and all light entering the metamaterial element will be transmitted.

The metamaterial element 2 is a very thin film made from a nanostructured metamaterial. The film is thin compared to the wavelength of the incident light. In particular in the visible and near-infrared part of the spectrum, this allows absorption of a single beam approaching 50% at a particular absorption resonance wavelength to be achieved.

Nanostructured plasmonic metamaterials are a type of artificial medium structured on a size scale smaller than the wavelength of an external stimulus, wherein the sub-wavelength structure has a sufficiently small periodicity to avoid diffraction. The plasmonic material will typically be a metal, but may also be a non-metal capable of supporting a surface plasmon. The metal is preferably gold, silver, aluminium, copper, or an alloy including one or more of these metals and a further metal or metals, or an alloy consisting only of two or more of these metals. A periodic structure of the metal is known as a metastructure or nanostructure, and may be produced by, for example, direct milling with a focussed ion beam or electron beam lithography or photolithography or nano-imprint or self-assembly of nanostructure.

Figure 2A:
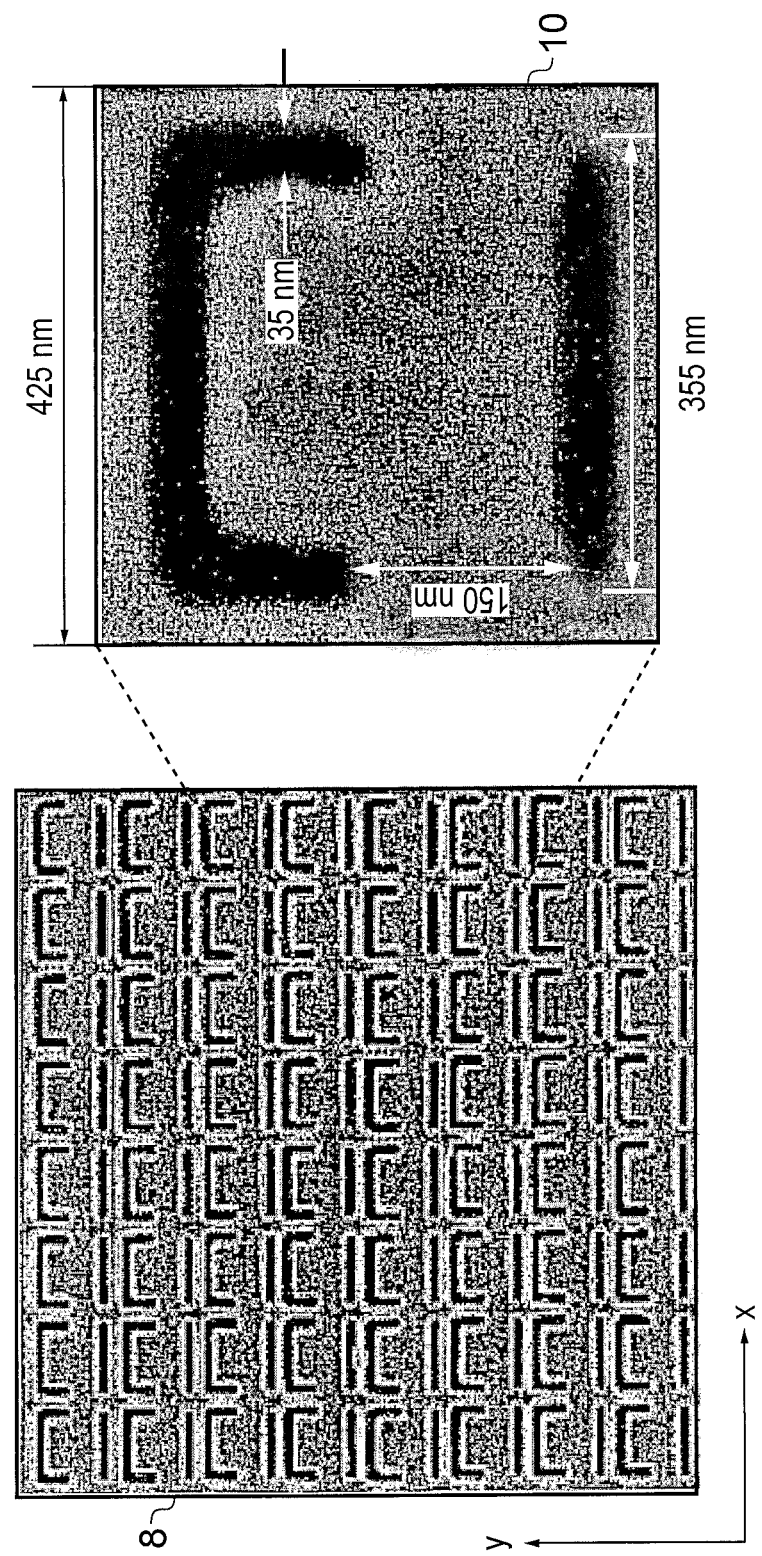
FIG. 2a shows an example of a metastructured plasmonic metal film providing a metamaterial, together with an enlarged image of a single unit cell.

FIG. 2a shows an example of a metastructured metal film 8 that could be used as a plasmonic metamaterial, together with an enlarged image of the unit cell 10 of the periodic metastructure pattern. In this example, the metastructure pattern is an asymmetric split-ring pattern. The metamaterial pattern has a period of 425 nm in both orthogonal in plan directions x and y, and has an absorption resonance wavelength of approximately 1500 nm. The shape and size of the unit cell of the metastructure alters the resonance absorption wavelength.

Figure 2B:
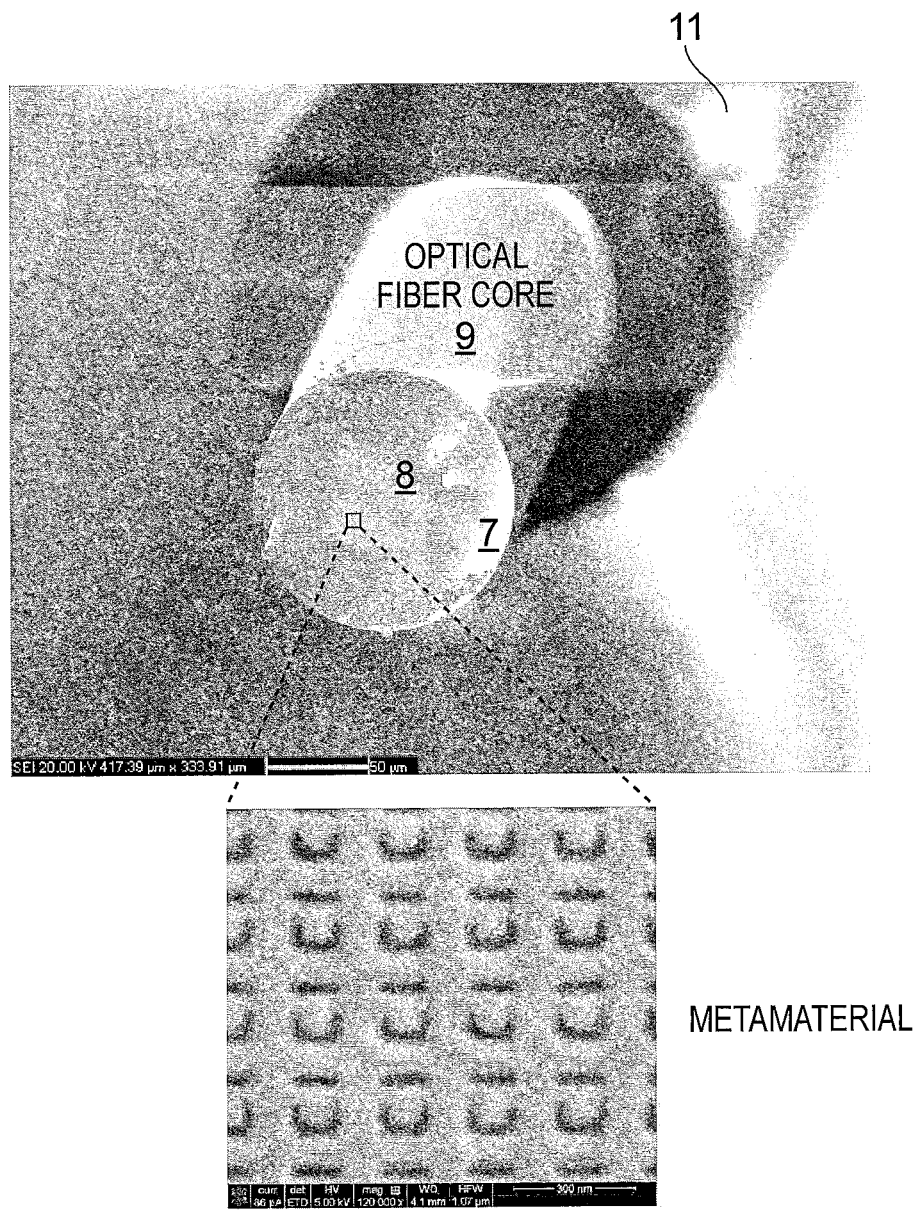
FIG. 2b is scanning electron micrograph of a metal metastructure pattern formed on the end face of an optical fibre.

FIG. 2b is scanning electron micrograph of a metal metastructure pattern 8 formed on the end face 7 of an optical fibre covering the core 9. The fibre coating 11 has been stripped away to leave an end portion of the bare fibre 9 free standing to assist the imaging. The detailed inset shows an enlarged view of the area of a 1 µm square portion of the metal metastructure. In this example, the bare fibre, and hence the cladding, has a diameter of approximately 125 µm and the core diameter is 9 µm. The size of the metal metastructure is 50 µm square covering the core and adjacent parts of the cladding. The illustrated inset shows a 1 µm square portion of the metal metastructure from which it can be seen that the metastructure period is approximately 200 nm.

Further, the metastructure may be embedded in a continuous fibre structure by fusing a further fibre to the end of the fibre with the metal metastructure.

In other embodiments, the metamaterial may be formed on and supported by a surface of another type of waveguide, such as a planar waveguide. The substrate may be made of any conventional material such as a glass, semiconductor, crystal or lithium niobate or related compounds.

Figure 3:
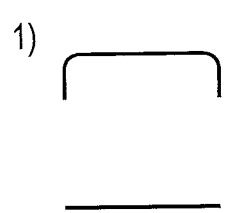
FIG. 3 illustrates examples of some possible metastructure unit cell geometries.
Figure 3:
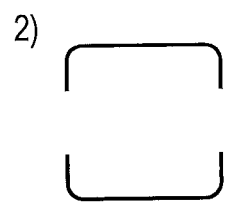
Figure 3:
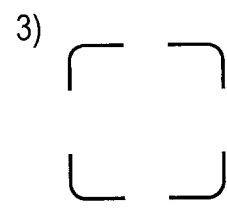
Figure 3:
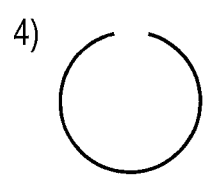
Figure 3:
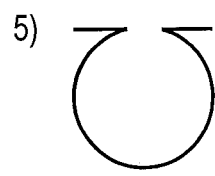
Figure 3:
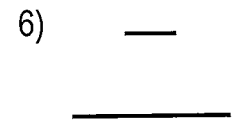
Figure 3:
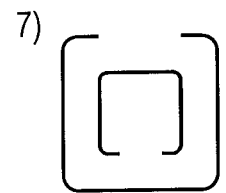

The designs most closely considered to date use a specific example of an asymmetric split-ring metamaterial pattern in gold. Other suitable metals include silver, aluminium or copper. In principle, any surface plasmonic material should work which will include other metals and some non-metals, such as transparent conductive oxides (for infrared applications) graphene, semiconductor carbon nanotubes and semiconductors. A suitable conductive oxide is indium tin oxide (ITO). Suitable semiconductors are silicon carbide and gallium arsenide. The device can also be exemplified with a wide range of periodic metamaterial pattern geometries including circular rings, oval rings, fishnet grids and so forth. FIG. 3 illustrates examples of some possible pattern geometries. Positive and negative examples of each pattern can be used, i.e. the structure may be formed by absence of metal (e.g. milling material out of a complete sheet) or presence of metal (e.g. selective deposition of line-like structures). Most current metastructures are based on planar or two-dimensional (2D) patterning. As technology progresses it is expected that techniques for fabricating three-dimensional (3D) metastructures will be developed, and the metamaterial element can also be used with such 3D metastructures.

Theoretically 50% single beam absorption is the maximum absorption that can be achieved in a thin film, including a metamaterial thin film, as now explained. At normal incidence, the reflection coefficient r and transmission coefficient t of the thin film in a symmetric environment are related to each other as $t=1 \pm r$ where the upper and lower signs are for s-polarized and p-polarized light respectively. The maximum absorption is then given by $A=1-|r|^2-|1 \pm r|^2$, which is limited to 50% (corresponding to $r=\frac{1}{2}$) [see Thongrattanasiri, Koppens and Garcia de Abajo, "Complete Optical Absorption in Periodically Patterned Graphene" Phys. Rev. Lett. 108, 047401 (2012)]. This value is increased when the film is thick (relative to the optical wavelength) or the environment is asymmetric, such as if the metamaterial film is fabricated on a dielectric substrate, resulting in different reflection and absorption for light incident from different sides.

Figure 4:
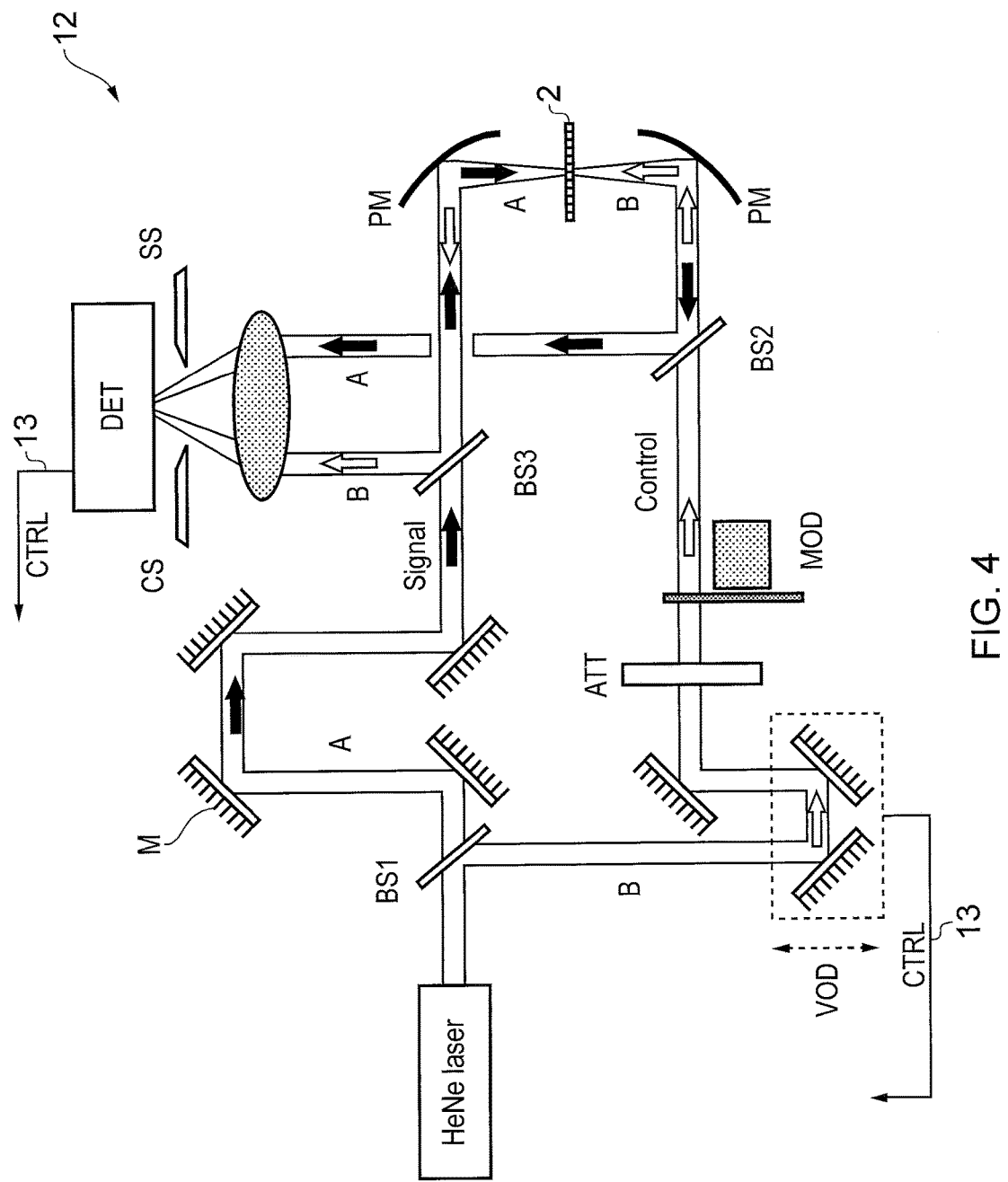
FIG. 4 shows a system example for realising light-by-light modulation using the scheme of FIGS. 1a and 1b.

FIG. 4 shows an example of an experimental system 12 for light-by-light modulation using the scheme of FIGS. 1a and 1b. A linearly polarized beam of light from a HeNe laser (outputting laser light of wavelength $\lambda=632.8$ nm) is split by a beam-splitter BS1 into two beams A and B which are adjusted to equal intensities by an attenuator ATT. The two beams A and B constitute the "signal" and "control" beams respectively, and are guided by a number of plane mirrors M. The beams are directed onto the metamaterial element 2 comprising the plasmonic metamaterial from opposite directions by parabolic mirrors PM. The phase of control beam B can be changed by a variable optical delay VOD and its intensity can be modulated by a modulator MOD to provide modulation in phase and amplitude as desired, thereby to modulate signal beam A.

The intensity of the beams transmitted through the metamaterial element 2 is monitored by the photo detector DET. A control shutter CS for shuttering the control beam B and a signal shutter SS for shuttering the signal beam A allow the photo detector DET to operate in two different regimes. In the first regime, both shutters CS and SS are open and therefore the photo detector DET registers the combined intensity of both beams (the difference of total travel distances for the signal and control beams to the detector is much longer the coherence length of the laser radiation so the beams do not interfere on the detector). In the second regime, one of the shutters CS and SS is closed and the other is open, so the photo detector DET only detects the intensity of the non-shuttered beam.

In this particular example, the metamaterial element 2 comprises a metamaterial with an asymmetric split-ring metastructure pattern (the pattern being similar to that shown in FIG. 2) fabricated in a 50 nm thick gold film (corresponding to approximately $\lambda/13$ thickness, given the 632.8 nm wavelength of the laser light). The film is supported by a silica substrate of approximately 170 µm thickness and surface roughness of less than 0.5 nm. The 50 nm gold is deposited on the silica substrate using low pressure $10^{-7}$ mbar thermal evaporation at a deposition rate of 0.05 nm/s. The metastructure is fabricated by direct milling with a focussed ion beam. The metastructure of the film supports a plasmonic Fano-type plasmonic mode of excitation that leads to a strong resonant absorption for y-polarized light (the y-direction with respect to the metastructure pattern as shown in FIG. 2). It is important that the size of the unit cell of the metamaterial is small enough that it does not diffract light at the laser wavelength. For this particular example, a metamaterial unit cell size of 250 nm×250 nm has been chosen, i.e. significantly less than the diffraction limit of λ/2.

In the system of FIG. 4, the phase tuning or modulation is in arm B. It would instead be possible to modulate the phase in arm A, or in both arms. What is important is the mutual phase of beams A and B at the plane of the metastructure element 2.

A control line 13 may be provided to connect the detector and the phase controller. The mutual phase can then be controlled in a feedback loop based on the intensity of the output signal received by the detector. This can be done once on set up to lock the phase relationship to the desired state—typically to set a node or antinode on the metamaterial element—or maintained a particular mutual phase during use in an ongoing manner. Another mode of operation would be to modulate the phase during use between node and antinode positions on the metamaterial element in discrete changes which may be with or without assistance from the control signal conveyed by the control line.

Figure 5C:
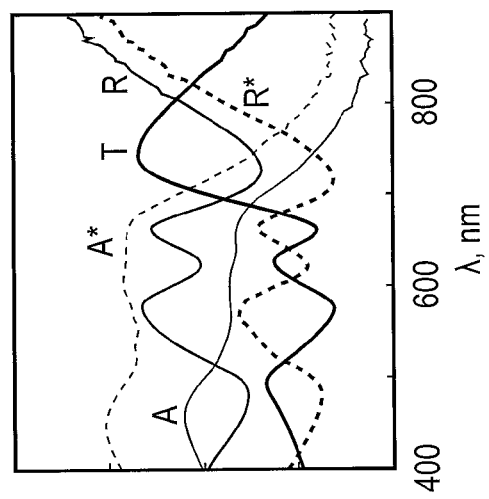
FIGS. 5b and 5c respectively show numerically simulated and experimentally measured graphs of transmission T, reflection R and absorption A spectra for the metamaterial element used in the system of FIG. 4.
Figure 5B:
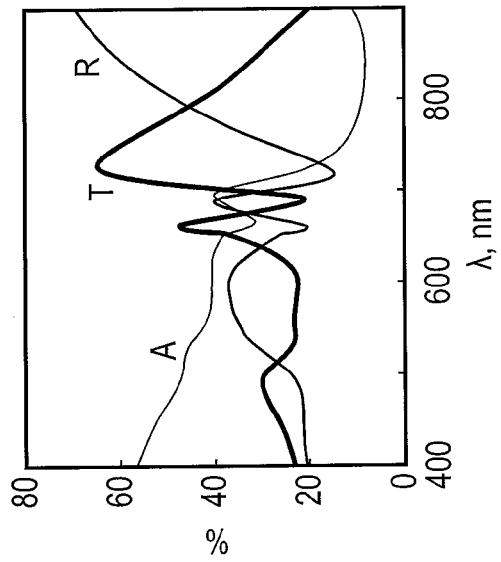
Figure 5A:
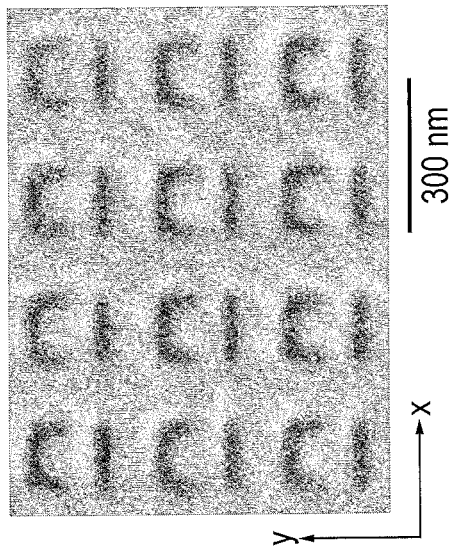
FIG. 5a is a scanning electron micrograph of a portion of the metastructure element used in the system example of FIG. 4.

FIG. 5a is a scanning electron micrograph of a portion of the metastructure element used in the system example of FIG. 4.

FIGS. 5b and 5c respectively show numerically simulated and experimentally measured graphs of transmission, reflection R and absorption A spectra for the metamaterial element used in the system of FIG. 4. The light is incident on the metamaterial from the air side (that is, the non-substrate side) at normal incidence with y-polarisation. It can be seen that the experimental results agree well with the simulations. The experimental spectra of FIG. 5c were obtained using a microspectrophotometer by CRAIC technology.

Figure 6A:
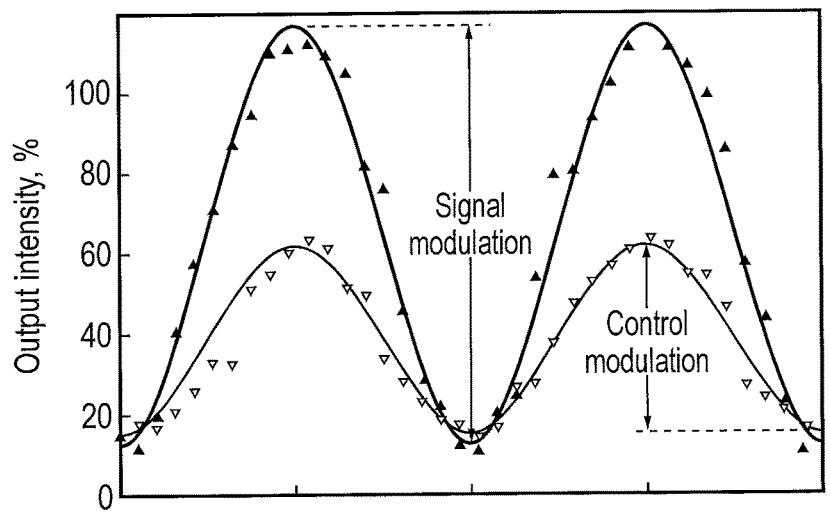
FIG. 6a shows how the transmitted intensities $I_S$ of the signal beam A and the control beam B change in response to change of phase ϕ of the control beam B in the system of FIG. 4.

FIG. 6a shows how the transmitted intensities $I_S$ of the signal beam A and the control beam B change in response to changing the phase φ of the control beam B in the experimental arrangement 12. Here, the phase φ of the control beam B is changed by the variable optical delay VOD in the B arm of the experimental arrangement 12. One can see that, upon changing the phase φ of the control beam B, the metamaterial element 2 is moved from a node of the standing wave (φ=π, 3π) to an anti-node (φ=0, 2π) and the transmitted intensity of the signal beam A passing through the metamaterial element is modulated between 115% and 10% of the incident intensity. At the same time, the transmitted intensity of the control beam B passing through the metamaterial element 2 is modulated between 64% and 15%. The signal beam modulation A MOD and control beam modulation B MOD are shown in FIG. 6a.

For an ideal, free-standing, zero-thickness 50% absorber one would see the signal beam A modulated between 0% and its full 100% incident intensity level. The somewhat different limits between which experimental modulation is observed are explained by a number of factors: Firstly, the sample's absorption level at the laser wavelength is not exactly 50%. Indeed, due to the presence of a substrate and to fabrication-related asymmetry/imperfection of the slots milled into the gold film, it shows differing levels of absorption (34% and 57%) for the two opposing propagation directions; Second, although the metamaterial is very thin it does have a finite thickness of λ/13; And finally, the laser source is not perfectly coherent—its emission includes an incoherent luminescence component.

Figure 6B:
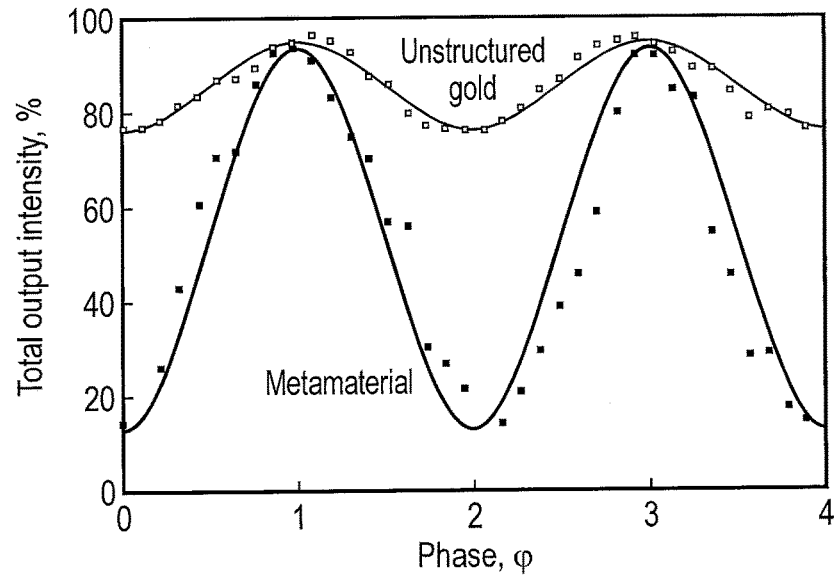
FIG. 6b shows how total intensity $I_T$ of light transmitted through the metamaterial depends on the mutual phase ϕ of the signal beam A and control beam B in the system of FIG. 4.

FIG. 6b shows how the total output intensity $I_T$ of light transmitted through the metamaterial (that is, the transmitted intensity of the signal beam A plus the transmitted intensity of the control beam B) depends on the mutual phase φ of the signal beam A and control beam B. It can be seen that nearly perfect absorption can be achieved when the mutual phase of the incident beams A and B is set to (φ=0, 2π).

For comparison, the output intensity variations for a simple unstructured gold film are also shown, in other words a control film which is of the same material and thickness as the metastructure film, but does not have any metastructuring, and hence no resonance at the beam wavelength. It can be seen that the phase evolution of the modulation is the same, but the amplitude of the modulation much weaker. This is a specific example illustrating the more general point that an equivalent unstructured thin metal film will have lower absorption than a metastructured counterpart, so in many cases it may be impossible to achieve the desired 50% absorption while at the same time meeting the device requirement that the film thickness is much smaller than the wavelength of the light. Moreover, use of a periodic metastructure allows design freedom to select any desired resonance wavelength across a broad range of the visible and near infrared spectrum by selecting an appropriate period, e.g. a period matched to a particular laser output frequency and/or a particular optimum frequency for long haul transmission through a telecoms fibre, such as the frequency of minimum dispersion or minimum absorption.

Figure 6C:
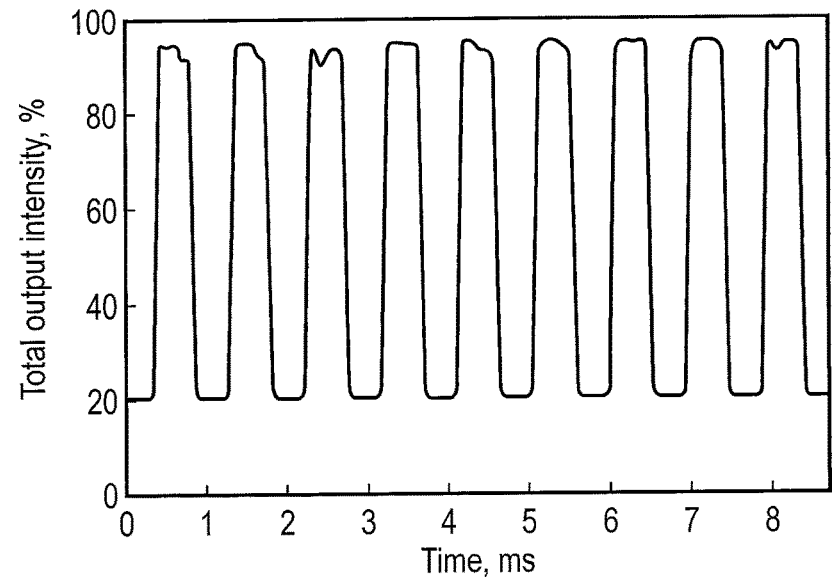
FIG. 6c shows modulation of the output intensity of the signal beam resulting from modulation of the control beam in the system of FIG. 4.

FIG. 6c shows modulation of the combined output intensity resulting from modulation of the control beam in the system of FIG. 4. More specifically, the graph shows the modulation of total output intensity resulting from modulation of the control beam's intensity in the time domain. When the control beam is blocked, only the signal wave is present at the metamaterial and the standing wave regime of light-metamaterial interaction is replaced by the traveling wave regime: In this example the metamaterial is initially located at a node of the standing wave where absorption is minimal (combined output intensity=95% of input); interruption of the control beam 'switches on' signal beam absorption and output, i.e. transmission, drops to approximately 20% of the input level. This proof-of-principle demonstration employs a mechanical chopper running at only 1.07 kHz. However, since the cross-beam modulation bandwidth will be limited only by the width of the resonant absorption peak, the inherent bandwidth of the process is likely to be in the THz range.

The above example shows controlling of light-with-light by absorption in a plasmonic metamaterial, which is achieved through adjustment of the mutual phase of signal and control beams incident on the plasmonic metamaterial.

In the example above, a metamaterial of λ/13 thickness was used. A different thickness could also have been used. However, to maintain the light-by-light modulation of the present invention, the metamaterial thickness should be kept sufficiently small compared to the wavelength of the light that is to be modulated. This is to ensure that the entirety of the metamaterial thickness can be kept within the vicinity of the standing wave node or antinode, as appropriate.

Figure 7:
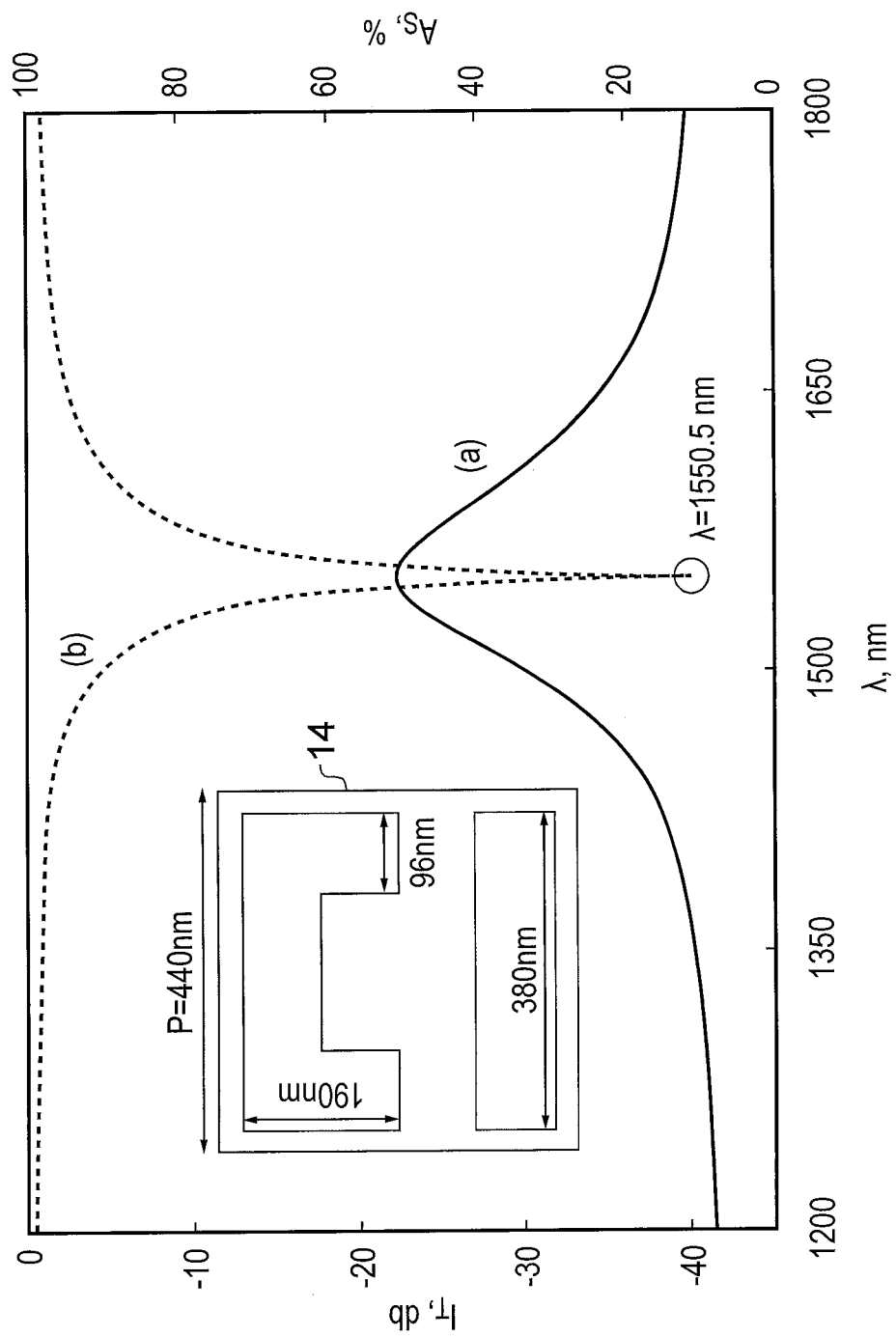
FIG. 7 shows the simulated absorption performance over a range of wavelengths of a free-standing (substrate free) 50 nm thick gold metamaterial film with an absorption line designed for the telecom band centred at 1550 nm.

FIG. 7 shows the simulated absorption performance over a range of wavelengths of a free-standing (substrate free) 50 nm thick gold metamaterial film with an absorption line designed for the telecom band centred at 1550 nm. This illustrates that the cross-beam modulation bandwidth is only limited by the width of the resonant absorption peak of the metamaterial and thus potentially allows for a THz bandwidth. Again, the metamaterial pattern is the asymmetric split-ring type, as can be seen from inset of the graph showing the metamaterial unit cell 14. Curve (a) shows the absorption $A_S$ for a single beam incident on the metamaterial and curve (b) shows the total output intensity $I_T$ when both a signal beam A and control beam B are incident on the metamaterial so that an antinode 6 is present at the metamaterial film.

Figure 8B:
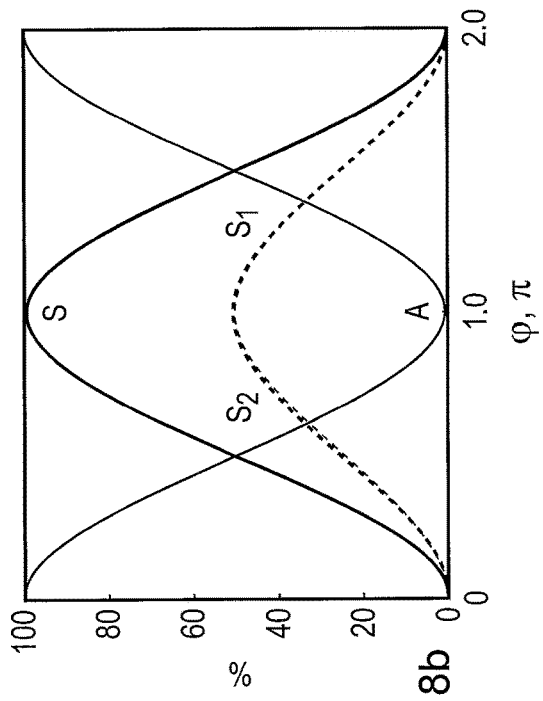
FIG. 8b shows transmission S and absorption A profiles at the 1550 nm absorption resonance wavelength.
Figure 8D:
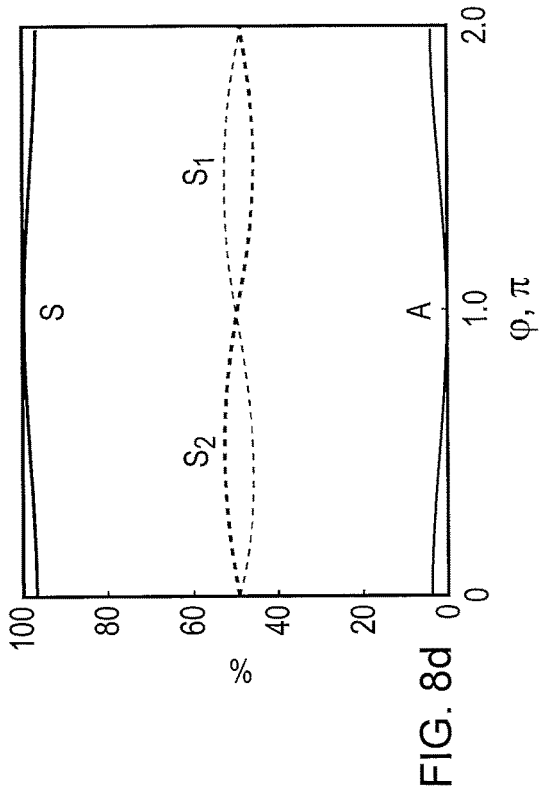
FIG. 8d, for comparison, shows transmission S and absorption A spectra for an unstructured 50 nm thick gold film.
Figure 8A:
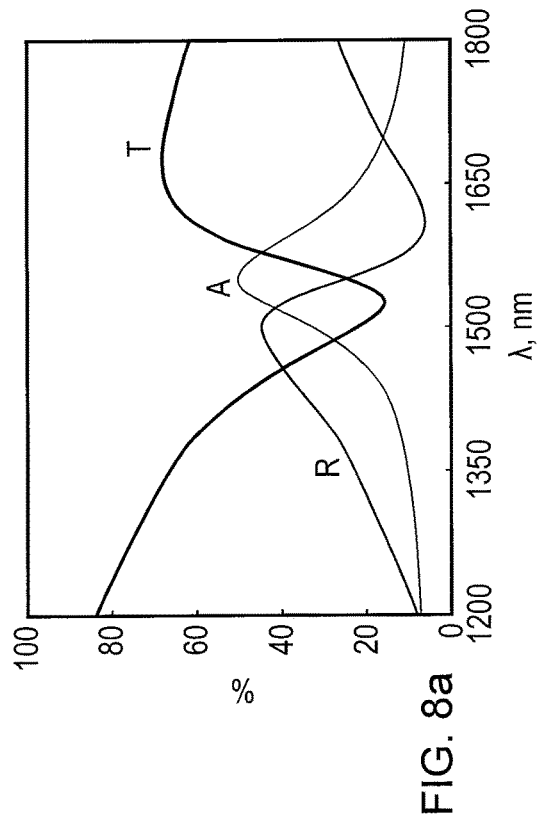
FIG. 8a shows transmission T, reflection R and absorption A spectra for the metannaterial film.

FIG. 8a shows transmission T, reflection R and absorption A spectra for the metamaterial. It can be seen that there is a maximum absorption of 50.18% at the 1550 nm absorption resonance wavelength. It is slightly higher than the ideal 50% due to the finite thickness of the metamaterial film.

FIG. 8b shows transmission S and absorption A profiles at the 1550 nm absorption resonance wavelength. It is seen that near perfect plasmonic transparency and absorption can be realized at this resonance wavelength by controlling the relative phase $\phi$ of the incident signal and control beams. The broken curves $S_1$ and $S_2$ represent the intensity of the two output ports of the virtual interferometer used in the simulation. These outputs are analogous to the signal beam and control beam inputs to the photo detector DET of FIG. 4, in that they measure the intensity of the transmitted signal beam and control beam separately.

Figure 8C:
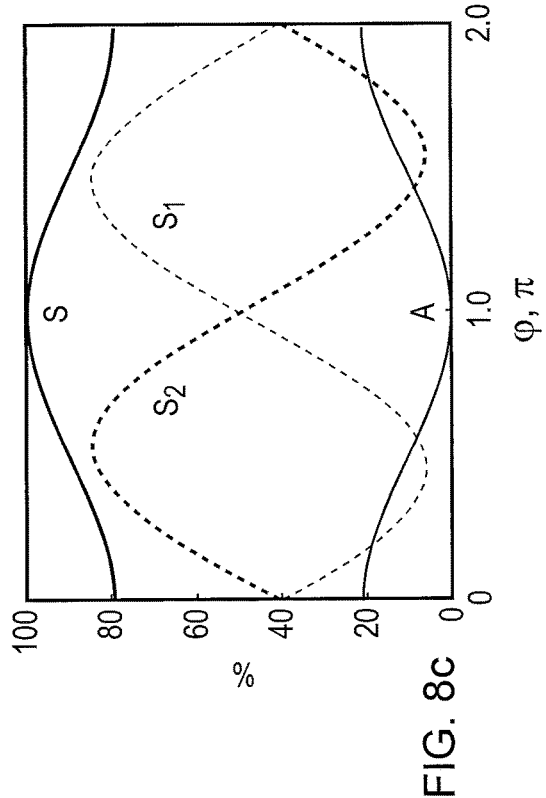
FIG. 8c corresponds to FIG. 8b but at a non-resonant wavelength of 1350 nm.

FIG. 8c shows that at a non-resonant wavelength of 1350 nm, the metamaterial absorption is much smaller and the transmission is high. The metamaterial thus behaves like a normal interferometer, with energy transferring between the two output ports as the relative phase $\phi$ of the signal beam and control beam changes.

FIG. 8d, for comparison, shows transmission S and absorption A spectra for unstructured 50 nm thick gold film (this gold film is therefore not a metamaterial). It can be seen that the transmission and absorption only varies by around 2% as the relative phase cp is changed. This is due to the fact that most of the light incident on unstructured gold is not transmitted or absorbed, but is reflected. The reflected light is thus detected at the output ports.

The simulated results of FIGS. 5a, 7 and 8a-8d were obtained using a fully three dimensional finite element package by COMSOL Multiphysics. Experimental values of the complex dielectric parameters for gold were utilised. For producing FIGS. 5a, 7 and 8a-8c, the following parameters were used: $\epsilon_{gold}=-9.51588-1.12858i$ for gold permittivity, $\epsilon_{silica}=2.1316$ for silica substrate permittivity (FIG. 5a only) and $\epsilon_{air}=1$ for air permittivity. For FIG. 8d (modelling the unstructured gold film), $\epsilon_{gold}=-132.024-12.6637i$ was used for the gold permittivity.

The modelling used for the simulations above relies on the well established data for gold complex conductivity taken from E. D. Palik, "Handbook of Optical Constants of Solids", Academic Press, San Diego, 1998. The simulations show that the metamaterial of FIGS. 7 and 8a will exhibit 50.18% single beam absorption at the 1550 nm absorption resonance wavelength. FIG. 8b shows that in the case that both the signal beam A and the control beam B are incident on the metamaterial at the resonant wavelength, the total absorption can be controlled to be between 0.38% to 99.99%. Also, the total transmitted intensity can be controlled to be between 0.01% to 99.62%.

The relatively broad nature of the metamaterial provides for modulation between 1% and 90% of total intensity levels across the entire spectral range from 1530 to 1575 nm, corresponding to 5.6 THz bandwidth.

The example of FIG. 7 illustrates the potential application for modulating telecom signals, i.e. signal processing. As well as telecom applications, the high sensitivity of absorption to the mutual phase of the signal and control beams lends itself for applications in sensors and laser spectroscopy.

Figure 9A:
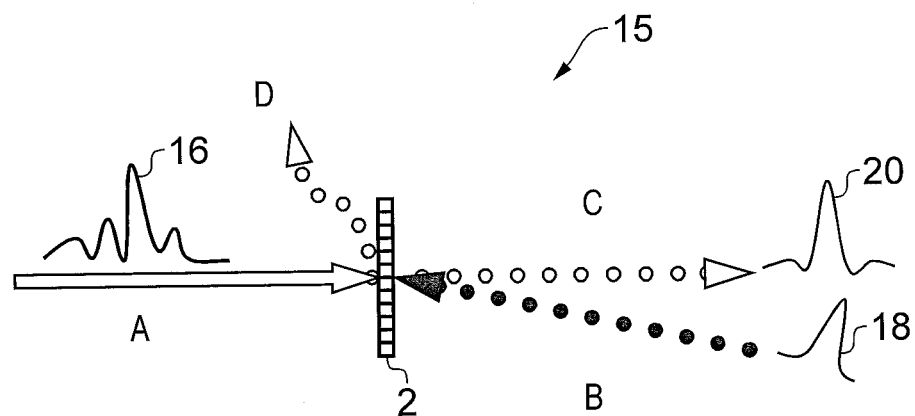
FIG. 9a illustrates a pulse restoration /clock recovery device.

FIG. 9a illustrates a pulse recovery device 15 as may be used in a receiver to recover the clock signal from a distorted signal transmitted over a long haul optical fibre, for example. In optical data systems, pulses become distorted as they travel because of dispersion and non-linear interactions, which slows down data distribution over processing networks. A distorted pulse 16 comprised within the signal beam A can be cleaned up by interacting with a clock pulse 18 comprised within the control beam B at the metamaterial element 2. If the phase of the clock pulse 18 is chosen correctly, spectral components of the distorted pulse 16 that have the same intensity and amplitude as the clock pulse 18 will not be absorbed, while the distorted components, which emerge as a result of dispersion and non-linear interactions and which do not have the same intensity and/or amplitude as the clock pulse, will be strongly absorbed. The distorted pulse 16 is thus restored to the shape of the clock pulse. The restored clock pulse 20 is comprised within the transmitted beam C. The dispersion and non-linear interaction components are comprised within the absorbed signal D.

Figure 9B:
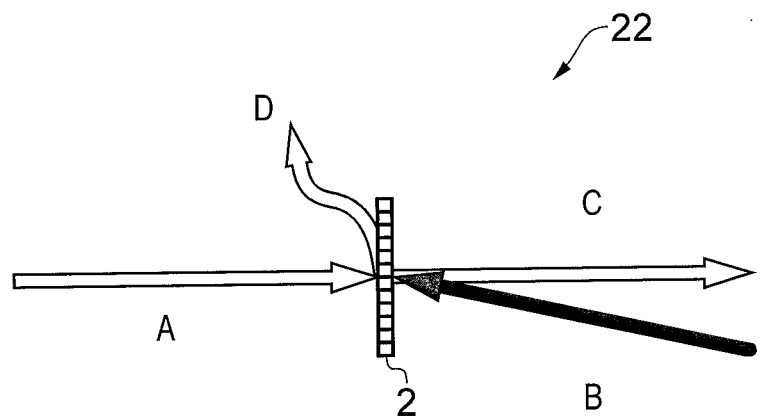
FIG. 9b illustrates a coherency filter.

FIG. 9b illustrates a coherence filter 22. This coherence filter operates on the same principle as the pulse recovery device. Namely, that the absorption of the components of a signal beam A which are coherent with respect to the control beam B can be enhanced or cancelled. The coherence of the transmitted beam C with respect to the control beam B can thus be reduced or increased, respectively. Again, the components not transmitted are comprised within the absorbed signal D.

Figure 9C:
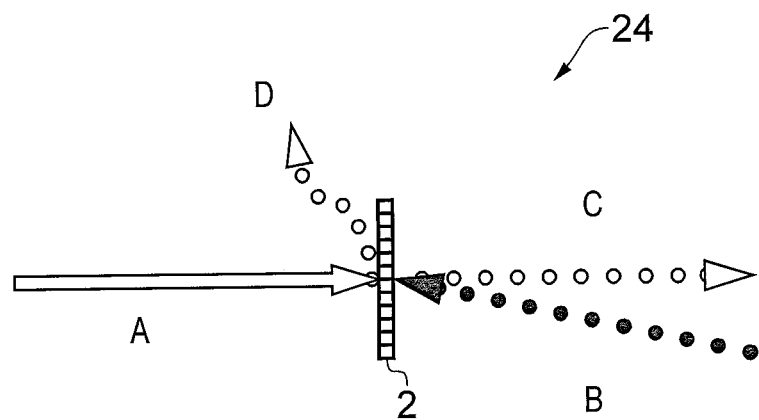
FIG. 9c illustrates an optical gate.

FIG. 9c illustrates an optical gate 24. The intensity of the transmitted beam C is controlled by the phase and/or intensity of the control beam B. The optical gate can therefore act as an AND gate. In a first embodiment, the phase $\phi$ of the control beam B is set so that a standing wave node 4 is present at the location of the metamaterial element 2. The transmitted beam C then acts as an output signal, which only has a high intensity if both the signal beam A and control beam B incident on the metamaterial element 2 have that same high intensity. In a second embodiment, the input signal of the control beam B is measured by the phase $\phi$, so that a phase $\phi$ where a node 4 is present at the metamaterial element 2 constitutes a high input signal where as a phase where an antinode 6 is present at the metamaterial element 2 constitutes a low input signal. The output signal C thus only has a high intensity if both the signal beam A has a high intensity and the phase $\phi$ of the control beam B is chosen so that it acts as a high input signal (generating a node 4 at the metamaterial element 2). In all embodiments, the non-transmitted light in the optical gate 24 is comprised within the absorbed signal D.

Figure 10A:
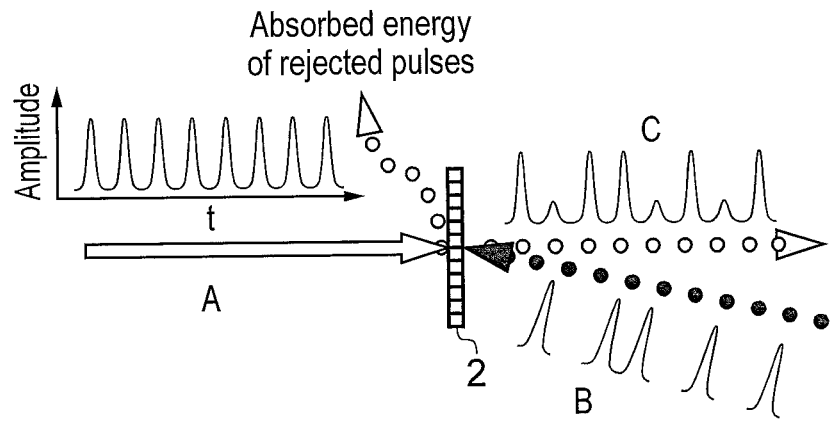
FIG. 10a illustrates a pulse picker/selector device.

FIG. 10a illustrates an optical pulse picker/selector device. Coherently-controlled metamaterial absorption/transparency is employed to select individual optical pulses from an incident signal pulse train A. Pulses will be transmitted to output C with negligible or low loss by the selector when they are temporally coincident on the metamaterial 2 with a control pulse in channel B of the correct phase. Where no control pulse is present, 'reject' signal pulses will experience strong (single-beam) absorption losses in the metamaterial. As schematically illustrated, this can be used in a data transmitter to write a signal onto a pulse train, thereby to encode data. Another application would be as a frequency divider to eliminate every nth pulse from a pulse train.

Figure 10B:
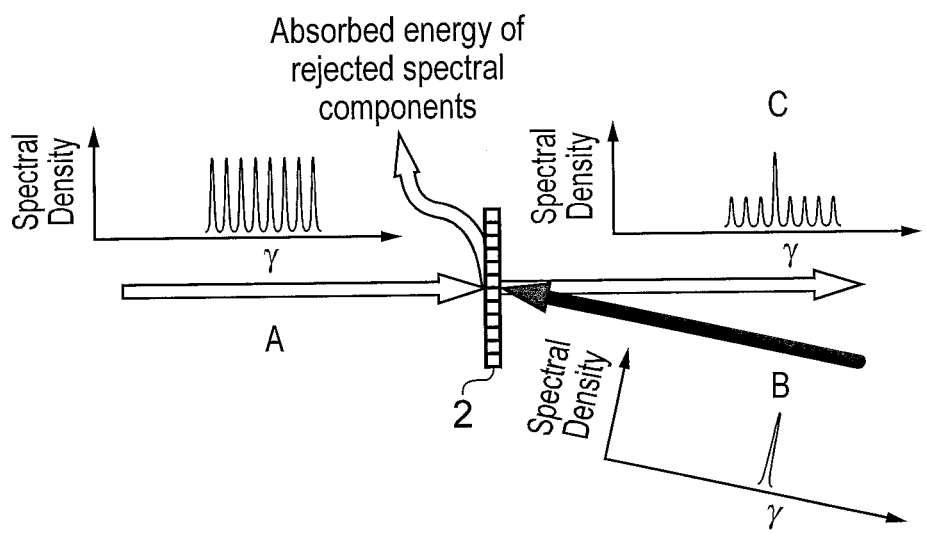
FIG. 10b illustrates a frequency selector device.

FIG. 10b illustrates a frequency selector device for wavelength division multiplexed (WDM) signals. Where the input signal A is made up of two or more frequency components, as in WDM, one or more of these can be selectively and simultaneously transmitted as signal C (with negligible or low loss) by a metamaterial absorber 2 through coherent interaction with a control input B at the target frequency(ies). 'Rejected' frequency components (absent from the control input) will experience strong (single-beam) absorption losses in the metamaterial. The schematic illustration shows the form of the control beam for picking out a single frequency.

Figure 10C:
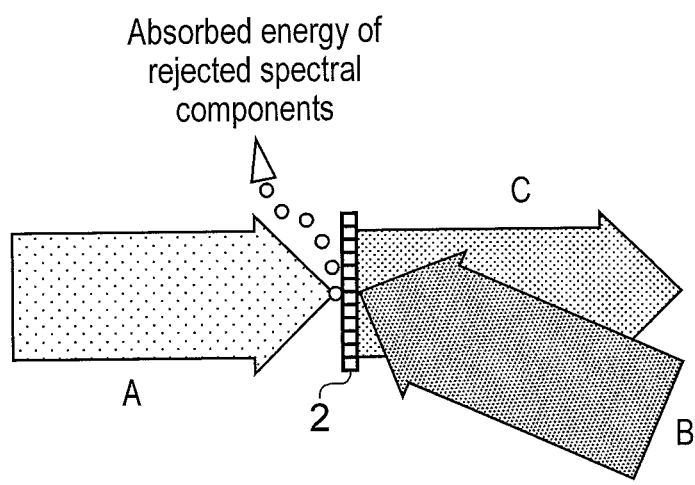
FIG. 10c illustrates a spatial mode selector device.

FIG. 10c illustrates a dynamic spatial mode selector device. Where the input signal A includes two or more spatial modes, one of these can be selectively transmitted as signal C (with negligible or low loss) by a metamaterial absorber 2 through coherent interaction with a control input B with the required mode structure. 'Rejected' modes will experience strong (single-beam) absorption losses in the metamaterial.

FIG. 11 is a schematic system of an optical fibre transmission system incorporating the pulse recovery device of FIG. 9a. FIGS. 12a, 12b and 12c are graphs showing the spectral density of the distorted signal, clock signal and improved signal respectively for the system of FIG. 11, as now described. An optical fibre telecom line 30 which forms at least part of a transmission path from a transmitter to a receiver has an inline metastructure film 2. The inset shows how the metastructure film has been formed part way along a fibre transmission line by first forming the film on an end facet of one fibre and then splicing that fibre to a further fibre as already described with reference to FIG. 2b. The fibre core is shown by the dashed line in the inset. A signal, typically a data bearing signal, will be injected into the fibre at the transmission end, at which point it will be substantially free of distortion. As the signal propagates along the fibre it will gradually become increasingly distorted owing to effects such as dispersion. Distortion in the transmission line 30 can be cleaned up as described above in connection with FIG. 9a. Namely, a clock signal can be injected into the fibre from the receiver side so that it is incident on the metamaterial 2 in the opposite direction than the distorted signal sent from the transmitter. In the system schematic, the clock signal is shown being injected into the transmission line via an intensity and phase modulator, in the form of a variable attenuator and phase delay 32, and a circulator 34. The modulator serves to allow the intensity and/or phase of the clock signal (acting as the control signal) to be adjusted so as to lock a node of the interference pattern in the plane of the metamaterial. The desired components of the distorted signal are thus transmitted substantially without loss, whereas the undesired components of the distorted signal, i.e. the distortion, are partially or substantially fully suppressed. The schematic graphs of distorted signal, clock signal and improved signal are shown in the frequency domain as spectral density v frequency, but could also be plotted in the time domain as power v time. The restored signal is then routed by the circulator 34 to the receiver. A circulator is shown for convenience of illustration, but it will be understood that any equivalent routing element could be used.

Further embodiments may additionally provide for modulation of the absorptive properties of the metamaterial element itself or a layer of another material arranged with the metamaterial element, for example a layer of another material formed on the other surface of a common substrate. The controllable absorptive properties that may be exploited may be controllable via temperature, applied voltage or current, or a further light beam, for example. Further background for gold, carbon nanotubes, chalcogenide glass and reconfigurable photonic metamaterials may be found in the following references respectively:

M. Ren, B. Jia, J. Y. Ou, E. Plum, J. Zhang, K. F. MacDonald, A. E. Nikolaenko, J. Xu, M. Gu, N. I. Zheludev "Nanostructured plasmonic medium for terahertz bandwidth all-optical switching" Adv. Mater. 23, 5540 (2011)

E. Nikolaenko, F. De Angelis, S. A. Boden, N. Papasimakis, P. Ashburn, E. Di Fabrizio, and N. I. Zheludev "Carbon nanotubes in a photonic metamaterial" Phys. Rev. Lett. 104, 153902 (2010)

Z. L. Sámson, K. F. MacDonald, F. De Angelis, B. Gholipour, K. Knight, C.-C. Huang, E. Di Fabrizio, D. W. Hewak, and N. I. Zheludev "Metamaterial electrooptic switch of nanoscale thickness" Appl. Phys. Lett. 96, 143105 (2010)

J. Y. Ou, E. Plum, L. Jiang, and N. I. Zheludev "Reconfigurable photonic metamaterials" Nano Lett. 11 (5), 2142-2144 (2011)

Optically responsive effects can be achieved with carbon nanotubes, phase change materials, such as chalcogenide glasses (including GeSbTe (GST) compounds and GaLaS (GLS) compounds) and through an optical nonlinearity of the metamaterial element itself, such as two photon absorption. Thermally responsive effects can be achieved with mechanically reconfigurable structures and liquid crystals. Electrically responsive effects can be acheived with phase change materials, such as chalcogenide glasses (including GeSbTe (GST) compounds and GaLaS (GLS) compounds) and liquid crystals. References to a reversible phase change refer to changes between a glass and a crystalline phase.

For convenience we provide a look up table below showing the thickness in nanometres of the metamaterial element for a number of different operating wavelengths A in nanometres in the visible to near infrared region.

| λ (nm) | Thickness/Periodicity (nm) | | | | | | | | | | | | |
|---|---|---|---|---|---|---|---|---|---|---|---|---|---|
| | 1/3 | 1/4 | 1/5 | 1/6 | 1/7 | 1/8 | 1/9 | 1/10 | 1/11 | 1/12 | 1/13 | 1/14 | 1/15 |
| 400 | 133 | 100 | 80 | 67 | 57 | 50 | 44 | 40 | 36 | 33 | 31 | 29 | 27 |
| 500 | 167 | 125 | 100 | 83 | 71 | 63 | 56 | 50 | 45 | 42 | 38 | 36 | 33 |
| 600 | 200 | 150 | 120 | 100 | 86 | 75 | 67 | 60 | 55 | 50 | 46 | 43 | 40 |
| 700 | 233 | 175 | 140 | 117 | 100 | 88 | 78 | 70 | 64 | 58 | 54 | 50 | 47 |
| 800 | 267 | 200 | 160 | 133 | 114 | 100 | 89 | 80 | 73 | 67 | 62 | 57 | 53 |
| 900 | 300 | 225 | 180 | 150 | 129 | 113 | 100 | 90 | 82 | 75 | 69 | 64 | 60 |
| 1000 | 333 | 250 | 200 | 167 | 143 | 125 | 111 | 100 | 91 | 83 | 77 | 71 | 67 |
| 1100 | 367 | 275 | 220 | 183 | 157 | 138 | 122 | 110 | 100 | 92 | 85 | 79 | 73 |
| 1200 | 400 | 300 | 240 | 200 | 171 | 150 | 133 | 120 | 109 | 100 | 92 | 86 | 80 |
| 1300 | 433 | 325 | 260 | 217 | 186 | 163 | 144 | 130 | 118 | 108 | 100 | 93 | 87 |
| 1400 | 467 | 350 | 280 | 233 | 200 | 175 | 156 | 140 | 127 | 117 | 108 | 100 | 93 |
| 1500 | 500 | 375 | 300 | 250 | 214 | 188 | 167 | 150 | 136 | 125 | 115 | 107 | 100 |
| 1600 | 533 | 400 | 320 | 267 | 229 | 200 | 178 | 160 | 145 | 133 | 123 | 114 | 107 |

-continued

| λ (nm) | 1/3 | 1/4 | 1/5 | 1/6 | 1/7 | 1/8 | 1/9 | 1/10 | 1/11 | 1/12 | 1/13 | 1/14 | 1/15 |
|---|---|---|---|---|---|---|---|---|---|---|---|---|---|
| | | | | | Thickness/Periodicity (nm) | | | | | | | | |
| 1700 | 567 | 425 | 340 | 283 | 243 | 213 | 189 | 170 | 155 | 142 | 131 | 121 | 113 |
| 1800 | 600 | 450 | 360 | 300 | 257 | 225 | 200 | 180 | 164 | 150 | 138 | 129 | 120 |
| 1900 | 633 | 475 | 380 | 317 | 271 | 238 | 211 | 190 | 173 | 158 | 146 | 136 | 127 |
| 2000 | 667 | 500 | 400 | 333 | 286 | 250 | 222 | 200 | 182 | 167 | 154 | 143 | 133 |

For example, if the metamaterial element is to be a tenth of a wavelength in thickness at an operating wavelength of 1500 nm, then it would be 150 nm thick. The same table can be used to consider the periodicity of the metastructuring, so for example if the periodicity of the metastructure was intended to be a third of a wavelength at 900 nm, then it would have a periodicity of 300 nm. We reserve the right to claim any finite combination of dimensions from the above table, in particular we reserve the right to claim any of the above values for the upper thickness of the metamaterial element in a specified range of the form "the metamaterial element has a thickness of less than . . . ", and an upper periodicity for the metastructuring of the metamaterial element of the form "the metamaterial element has a metastructure periodicity of less than . . . ".

It is noted that in the system example a single laser source is used to generate both the control and signal beams through the use of a beam splitter. In other embodiments, separate laser sources could be used to generate the respective beams. For example in a telecoms application, the signal beam source could be on the transmitter side and the control beam source could be on the receiver side.

For optimal performance of the device when operating in phase modulation mode, i.e. the device is controlled by phase modulation of the control beam, it is preferable that the intensity of the signal and control beams have similar values. For optimal performance of the device when operating in intensity modulation mode, i.e. the device is controlled by intensity modulation of the control beam, it is preferably that the control beam intensity is modulated between an intensity similar to the intensity of the signal beam and a zero intensity value.

It is further noted that performance in some applications can be improved by cascading the devices. For example, in the device applications which serve to remove distortion or noise from a signal, such as the clock recovery application and coherency filter application, it may be beneficial to arrange 2, 3 or more metamaterial elements in series, or to route the signal through the same metamaterial element 2, 3 or more times.

In summary, the light-by-light modulation as presented provides functionality for analogue and digital modulation and switching without the need for intense laser fields or an optically non-linear medium, as has previously been the case. This modulation/switching functionality can therefore be delivered at extremely low power levels. As described above, the light-by-light modulation described herein can provide devices with an extremely high, terahertz frequency modulation bandwidth that is determined by the width of the resonance in the metamaterial element. Using plasmonic metal or metallic structures, light-by-light modulators can be realised throughout the visible and near-infrared parts of the electromagnetic spectrum, where plasmonic resonances can be engineered and metal Joule losses are substantial. A metamaterial element of the type normally associated with being exploited as a non-linear medium for hosting effects such as four wave mixing or two-photon absorption is instead being incorporated in a device and exploited for simple resonant absorption which is a linear effect which therefore has no intensity threshold to overcome for it to operate. Extremely low power and rapid modulation is therefore possible.

The invention claimed is:
1. A device for processing light with light, comprising:
a first input for receiving a signal beam of coherent light at a wavelength;
a second input for receiving a control beam of coherent light having the wavelength;
a metamaterial element having a thickness and lateral structure having a size scale substantially smaller than the wavelength of the beams and arranged to receive the control beam and the signal beam on opposite sides thereof;
a phase and intensity adjuster operable to set the mutual phase of the signal and control beams such that a standing wave is formed having a node or an antinode coinciding with the metamaterial element, wherein:
absorption of the signal beam by the metamaterial element changes based on interaction between the metamaterial element and the standing wave: and
the node of the standing wave coinciding with the metematerial element causes of absorption of the signal beam by the metamaterial element to be different from absorption of the signal beam by the metamaterial element when the antidote of the standing wave coincides with the metamterial element; and
an output for transmitting a component of the signal beam after transmission through the metamaterial element.
2. The device of claim 1, further comprising a control laser source for providing the control beam to the second input.
3. The device of claim 1, further comprising a signal laser source for providing the signal beam to the first input.
4. The device of claim 1, further comprising a laser source for providing both the signal beam and the control beam to the first and second inputs respectively.
5. The device of claim 1, further comprising a sensor for detecting intensity of the component of the signal beam transmitted through the output.
6. The device of claim 5, wherein the sensor is connected to the phase and intensity adjuster to set the mutual phase responsive to detected intensity.
7. The device of claim 1, wherein the phase and intensity adjuster includes a phase modulator operable to vary the phase of the control beam incident on the metamaterial element, so as to switch between a node and an antinode of the interference pattern coinciding with the metamaterial element to effect a modulation of the signal beam's transmission through the metamaterial element.

8. The device of claim 1, wherein the phase and intensity adjuster includes an intensity modulator operable to vary the intensity of the control beam incident on the metamaterial element between first and second intensities to effect a modulation of the signal beam's transmission through the metamaterial element.

9. The device of claim 1, wherein the lateral structure of the metamaterial element has a period which provides the metamaterial element with a resonance at the wavelength.

10. The device of claim 9, wherein the resonance is a plasmon resonance.

11. The device of claim 1, wherein the output is also arranged to transmit a component of the control beam after transmission through the metamaterial element.

12. The device of claim 1, wherein the thickness and lateral structure of the metamaterial element are dimensioned such that the transmitted component of the signal beam in the presence of said control beam when a node of the interference pattern is coincident with the metamaterial element has an intensity greater than in the absence of said control beam.

13. The device of claim 1, wherein the thickness and lateral structure of the metamaterial element are dimensioned such that the transmitted component of the signal beam in the presence of said control beam when a node of the interference pattern is coincident with the metamaterial element has at least 70, 80, 90, 95 or 98% of the intensity of the signal beam incident on the metamaterial element.

14. The device of claim 1, wherein the metamaterial element is arranged embedded in, or on the end face of, a waveguide transverse to the waveguide channel.

15. The device of claim 1, wherein the interaction between the metamaterial element and the standing wave does not change the index of refraction of the metamaterial element for the wavelength of the signal beam.

16. A method of processing light with light comprising:
providing a signal beam of coherent light at a wavelength;
providing a control beam of coherent light having the wavelength;
providing a metamaterial element having a thickness substantially smaller than the wavelength of the beams and structured laterally on a size scale substantially smaller than the wavelength of the beams;
directing the control beam and the signal beam to be incident on the metamaterial element in opposite directions; and
setting the mutual phase of the signal and control beams such that a standing wave is formed having a node or an antinode coinciding with the metamaterial element, thereby to control transmission of the signal beam through the metamaterial element, wherein:
absorption of the signal beam by the metamaterial element changes based on interaction between the metamaterial element and standing wave; and
the node of the standing wave coinciding with the metamaterial element causes absorption of the signal beam by the metamaterial element to be different from absorption of the signal beam by the metamaterial element when the antinode of the standing wave coincides with the metamaterial element.

17. The method of claim 16, wherein the mutual phase is modulated to alternate between a node and an antinode of the interference pattern coinciding with the metamaterial element to effect a modulation of the signal beam's transmission through the metamaterial element.

18. The method of claim 16, wherein the intensity of the control beam is modulated to effect a modulation of the signal beam's transmission through the metamaterial element.

19. The method of claim 16, further comprising:
measuring the intensity of the signal beam after its transmission through the metamaterial element.

20. The method of claim 16, wherein the lateral structure has a periodicity matched to the wavelength.

21. The method of claim 16, wherein the thickness and lateral structure of the metamaterial element are dimensioned such that the transmitted component of the signal beam in the presence of said control beam when a node of the interference pattern is coincident with the metamaterial element has an intensity greater than in the absence of said control beam.

22. The method of claim 16, wherein the thickness and lateral structure of the metamaterial element are dimensioned such that the transmitted component of the signal beam in the presence of said control beam when a node of the interference pattern is coincident with the metamaterial element has at least 70, 80, 90, 95 or 98% of the intensity of the signal beam incident on the metamaterial element.

23. The method of claim 16, wherein the lateral structure of the metamaterial element has a period which provides the metamaterial element with a resonance at the wavelength.

24. The method of claim 23, wherein the resonance is a plasmon resonance.

25. The method of claim 16, wherein the interaction between the metamaterial element and the standing wave does not change the index of refraction of the metamaterial element for the wavelength of the signal beam.

* * * * *